US006877706B2

(12) United States Patent
Harrison

(10) Patent No.: US 6,877,706 B2

(45) Date of Patent: Apr. 12, 2005

(54) BANJO AND GUITAR STAND

(76) Inventor: John B. Harrison, 31147 Old Santiam Hwy., Lebanon, OR (US) 97355

( * ) Notice: Subject to any disclaimer, the term of this patent is extended or adjusted under 35 U.S.C. 154(b) by 0 days.

(21) Appl. No.: 10/602,042

(22) Filed: Jun. 24, 2003

(65) Prior Publication Data

US 2004/0056166 A1 Mar. 25, 2004

Related U.S. Application Data

(60) Provisional application No. 60/412,553, filed on Sep. 23, 2002.

(51) Int. Cl.[7] .......... F16M 11/38

(52) U.S. Cl. .......... 248/434; 248/166; 248/165; 248/447; 211/195

(58) Field of Search .......... 108/29; 248/165, 248/166, 434, 447, 454, 146, 150; 211/195, 856.7; 84/327; 297/16, 42

(56) References Cited

U.S. PATENT DOCUMENTS

| | | | | | |
|---|---|---|---|---|---|
| 371,100 | A | * | 10/1887 | Spipelt | 248/449 |
| 557,867 | A | * | 4/1896 | Norton | 108/12 |
| 701,826 | A | * | 6/1902 | Amerman et al. | 4/480 |
| 743,048 | A | * | 11/1903 | Suffern | 248/455 |
| 956,399 | A | * | 4/1910 | Morse | 211/85 |
| 1,342,202 | A | * | 6/1920 | Cox | 84/327 |
| 1,358,235 | A | * | 11/1920 | Nylin | 280/47.34 |
| 1,673,205 | A | | 6/1928 | Romao | |
| 2,141,881 | A | * | 12/1938 | Schray | 280/651 |
| 2,452,929 | A | * | 11/1948 | Holcomb | 280/652 |
| 2,965,236 | A | * | 12/1960 | Klein | 108/16 |
| 3,693,996 | A | * | 9/1972 | Hardy | 280/47.34 |
| 3,799,488 | A | * | 3/1974 | Sena | 248/452 |
| 4,072,209 | A | * | 2/1978 | Bolis | 182/116 |
| 4,102,065 | A | * | 7/1978 | Selden | 38/102.1 |
| 4,421,318 | A | * | 12/1983 | Sverdlik | 273/395 |
| 4,483,505 | A | * | 11/1984 | Dalbo | 248/447 |
| 4,523,403 | A | * | 6/1985 | Ivy et al. | 43/17 |
| 4,943,021 | A | | 7/1990 | Cien et al. | 248/167 |
| 5,197,701 | A | | 3/1993 | Olson | 248/166 |
| 5,350,143 | A | | 9/1994 | Hoshino | 248/166 |
| 5,375,497 | A | | 12/1994 | Pirchio et al. | 84/327 |
| 5,383,634 | A | | 1/1995 | Liao | 248/166 |
| 5,490,688 | A | * | 2/1996 | Cheng | 280/655 |
| 5,497,689 | A | | 3/1996 | Hoshino | 84/327 |
| 5,744,735 | A | | 4/1998 | Liao | 84/327 |
| D394,764 | S | * | 6/1998 | Nordstrom | D6/462 |
| 5,833,178 | A | * | 11/1998 | Plasse et al. | 248/27.8 |
| 5,860,897 | A | * | 1/1999 | Gilbert et al. | 482/130 |
| 5,957,417 | A | | 9/1999 | Yu | 248/166 |
| 5,959,225 | A | | 9/1999 | Hsu | 84/327 |
| 6,217,045 | B1 | * | 4/2001 | Leyton | 280/79.7 |
| 6,296,213 | B1 | | 10/2001 | Law, III et al. | 248/166 |
| 6,323,406 | B1 | | 11/2001 | Park | 84/327 |
| 6,585,315 | B1 | * | 7/2003 | Vail | 297/186 |
| 6,729,632 | B1 | * | 5/2004 | Ferrigan | 280/79.7 |

FOREIGN PATENT DOCUMENTS

| | | | |
|---|---|---|---|
| CA | 2182819 | * | 2/1998 |

* cited by examiner

*Primary Examiner*—Kimberly Wood
(74) *Attorney, Agent, or Firm*—Richard C. Litman

(57) ABSTRACT

A folding banjo and guitar stand made-up of a first inverted U-shaped bar, with an upper portion, a middle portion and a lower portion with two ends, that acts as a rear support for a banjo or a guitar being secured in an upright position by a second inverted U-shaped bar, with an upper portion and a lower portion with two ends, that is attached to the lower portion of the first inverted U-shaped bar and two folding support hinges that attach the upper portion of the first inverted U-shaped bar to the upper portion of the second inverted U-shaped bar. The folding banjo and guitar stand is also foldable, lightweight and is designed to protect a secured instrument and ground surfaces from scratching and damage.

6 Claims, 3 Drawing Sheets

BANJO AND GUITAR STAND

CROSS-REFERENCE TO RELATED APPLICATION

This application claims the benefit of U.S. Provisional Patent Application Ser. No. 60/412,553, filed Sep. 23, 2002.

BACKGROUND OF THE INVENTION

1. Field of the Invention

The present invention relates to a portable folding banjo and guitar stand.

2. Description of Related Art

Guitars and banjos have always been popular musical instruments. Whether being transported in an instrument case or carried alone, guitars and banjos have always been very mobile musical instruments. Like most musical instruments, guitars and banjos also use instrument stands to secure them in place, with many types of guitar and banjo stands being well-known and reflected in the related art.

U.S. Pat. No. 1,673,205 issued to Romao, outlines the use of a banjo stand in combination with a cloth protector, which is easily applied to the banjo stand, which also protects the banjo from direct contact with the stand when both are used and assembled. The banjo stand also conveniently folds-up and easily stores with the cloth protector in most banjo cases.

U.S. Pat. No. 4,943,021 issued to Cien et al., outlines the use of a compact collapsible portable guitar stand that has a rear support leg, a backrest support leg and a pair of lateral side support legs, all of which are pivotally secured to a T-hinge assembly. A pair of support arms having upright members on their front ends each have their rear ends pivotally secured to the hinge assembly and they function to support the bottom end of a guitar.

U.S. Pat. No. 5,197,701 issued to Olson, outlines the use of a musical instrument stand for enabling the instrument to remain in an upright position when not in use and be retained on the instrument when the instrument is in use.

U.S. Pat. No. 5,350,143 issued to Hoshino, outlines the use of a collapsible stand for use in supporting a guitar or other similar object. The stand includes a top main member and a central leg which is pivotable forwardly and rearwardly of the main member. In the forward position, the central leg is in a supporting position. Right and left side legs are provided to the left and right of the central leg and the side legs are pivotable outwardly away from the central leg.

U.S. Pat. No. 5,375,497 issued to Pirchio et al., outlines the use of an adjustable portable stand for supporting an elongated instrument by its base in a generally upright orientation, which includes a multiple leg assembly and first and second vertically extending rigid legs. First and second supports project outwardly from the first and second legs for cooperatively supporting the base of an elongated instrument. Each of the supports are independently adjustable along the longitudinal axis of its respective leg and are fixable at a selected point.

U.S. Pat. No. 5,383,634 issued to Liao, outlines the use of a collapsible guitar stand, which includes a top member having two bottom holes spaced by a bottom frame, with two front legs pivotably connected to either bottom hole of the top member, a back leg pivotably connected to a longitudinal groove on the bottom frame and two supporting rods pivotably connected to oblong holes on the front legs to hold a guitar on.

U.S. Pat. No. 5,497,689 issued to Hoshino, outlines the use of a generally U-shaped body with the U-opening towards the front side of the stand. A pair of front legs are attached to the left and right front sides of the stand and are rotatable left and right at their journaled attachment to the front of the body. Left and right rear legs are attached to the left and right ends toward the rear side of the body and are journaled to swing forward and rearward.

U.S. Pat. No. 5,744,735 issued to Liao, outlines the use of a folding guitar stand which includes a top member and two legs pivotably connected to a hollow bottom side of the top member. Two connecting rods are pivotably connected to the legs for supporting the guitar and two foot members respectively fixed to the legs at the bottom, with each foot member having two balance rods being pivotal in opposite directions for supporting the stand on the ground.

U.S. Pat. No. 5,957,417 issued to Yu, outlines the use of a guitar stand that has an adjustment joint, a support rod connected to the adjustment joint and two outer pipes receiving the inner pipes respectively. Two leg joints are connected to the outer pipes and two leg rods are connected to the leg joints, while two brackets are disposed on the inner pipes respectively.

U.S. Pat. No. 5,959,225 issued to Hsu, outlines the use of a guitar rack structure that is made up of a fixing plate and two leg stands, each of the leg stands are tightened by a screw onto the right and left parts of the fixing plate. There is an additional fitting of a length adjustable upright rod onto the fixing plate, with the top end of the upright rod having a Y-shaped fork.

U.S. Pat. No. 6,296,213 issued to Law, III et al., outlines the use of a musical instrument stand which can hold a number of musical instruments by a supporting structure that partly includes the structure of a case having top and bottom halves that are hinged together. The top and bottom halves are pivoted open to place the top half in a substantially vertical position, where the top half holds a supporting yoke for holding an instrument, such as the neck of a guitar resting against a pad in the bottom half of the structure.

U.S. Pat. No. 6,323,406 issued to Park, outlines the use of a guitar stand used to prominently display guitars and more particularly, to a guitar stand that is light and is easily folded so as to obtain convenience in storing and carrying a guitar. The guitar stand is capable of sustaining the guitar in a stable fashion, so as to stand it up against a certain degree of impact. The guitar stand also allows advertisements to appear on its front plate so as to improve its advertisement effect.

Although each of these patents outline useful and unique devices, many have the problem of scratching the musical instrument that they are displaying and can also be cumbersome to carry with the musical instrument. If a sturdy and portable banjo and guitar stand were available that was compact and were made of materials that would not damage the banjo or guitar being displayed, it would be useful to a great number of banjo and guitar players in the marketplace.

None of the above inventions and patents, taken either singly or in combination, is seen to describe the instant invention as claimed.

SUMMARY OF THE INVENTION

The invention is a folding banjo and guitar stand made-up of a first inverted U-shaped bar, with an upper portion and a lower portion, that acts as a rear support for a banjo or a guitar being secured in an upright position by a second inverted U-shaped bar, with an upper portion and a lower portion, that is attached to the lower portion of the first inverted U-shaped bar and two folding support hinges that attach the upper portion of the first inverted U-shaped bar to the upper portion of the second inverted U-shaped bar. The folding banjo and guitar stand is also foldable, lightweight and is designed to protect a secured instrument and ground surfaces from scratching and damage.

Accordingly, it is a principal object of the invention to provide a portable folding banjo and guitar stand.

It is another object of the invention to provide a portable folding banjo and guitar stand that can fold up for easy transport.

It is a further object of the invention to provide a lightweight portable folding banjo and guitar stand that won't scratch the surface it is resting on.

Still another object of the invention is to provide a portable folding banjo and guitar stand that can hold an instrument without scratching the instrument.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
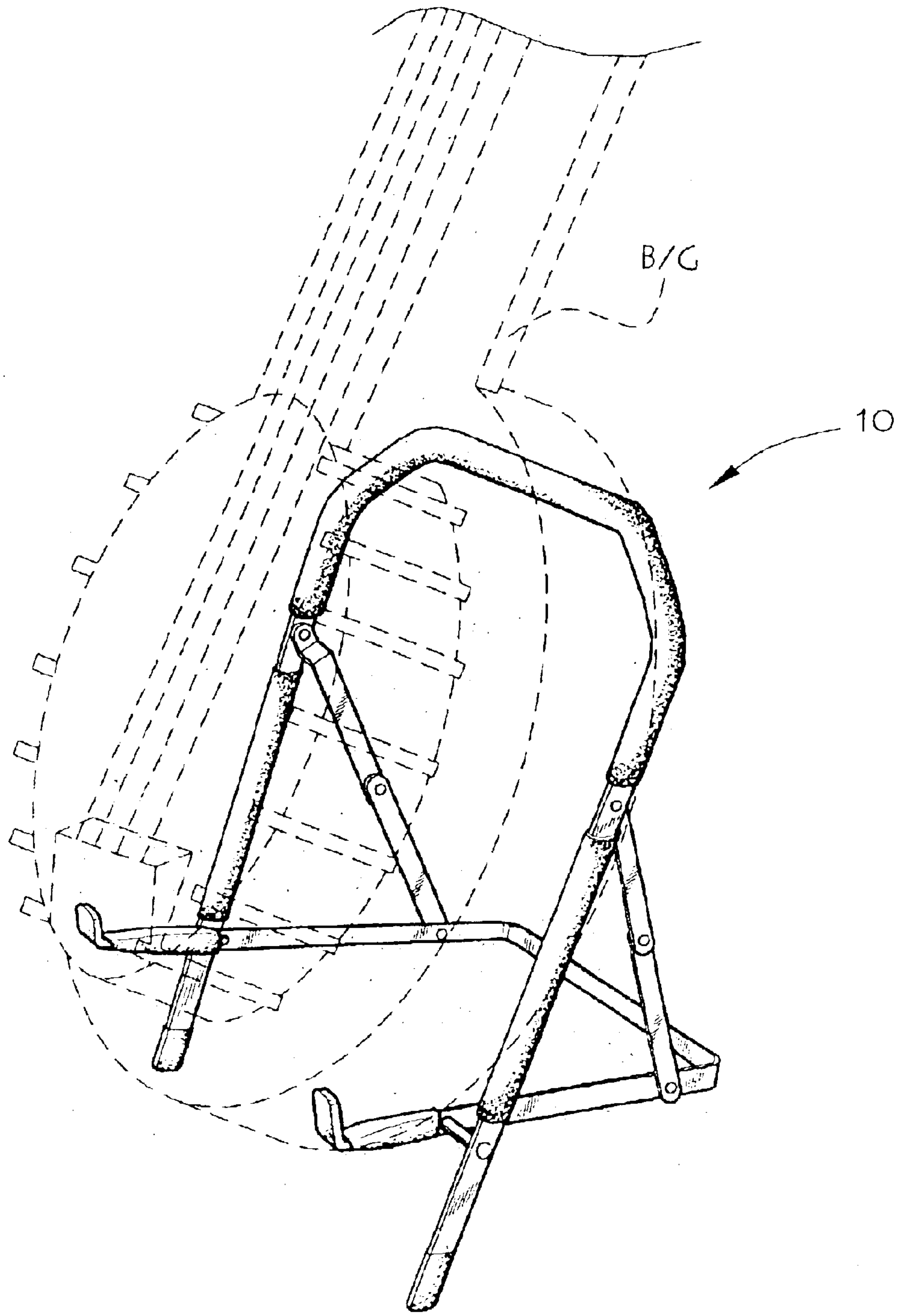
FIG. 1 is an environmental, perspective view of a banjo and guitar stand according to the present invention.

The present invention is a folding banjo and guitar stand 10, that can secure a banjo or guitar B or G in an upright position. The folding banjo and guitar stand 10 is shown in FIG. 1 holding a banjo in place. Note that the folding banjo and guitar stand 10 can also secure a guitar G in place, as well as a banjo B.

The folding banjo and guitar stand 10 comprises a first inverted U-shaped bar 20, with an upper and middle portion 22 and a lower portion with two ends 24, that acts as a rear support for a banjo or a guitar B or G being secured in an upright position. There is also a second inverted U-shaped bar 30, with an upper portion 32 and a lower portion with two ends 34, that is attached to the lower portion of the first inverted U-shaped bar 24 with a bolt 26 and a spacing device 28. There are two folding support hinges 40 that attach the upper portion of the first inverted U-shaped bar 22 to the upper portion of the second inverted U-shaped bar 32.

Figure 2:
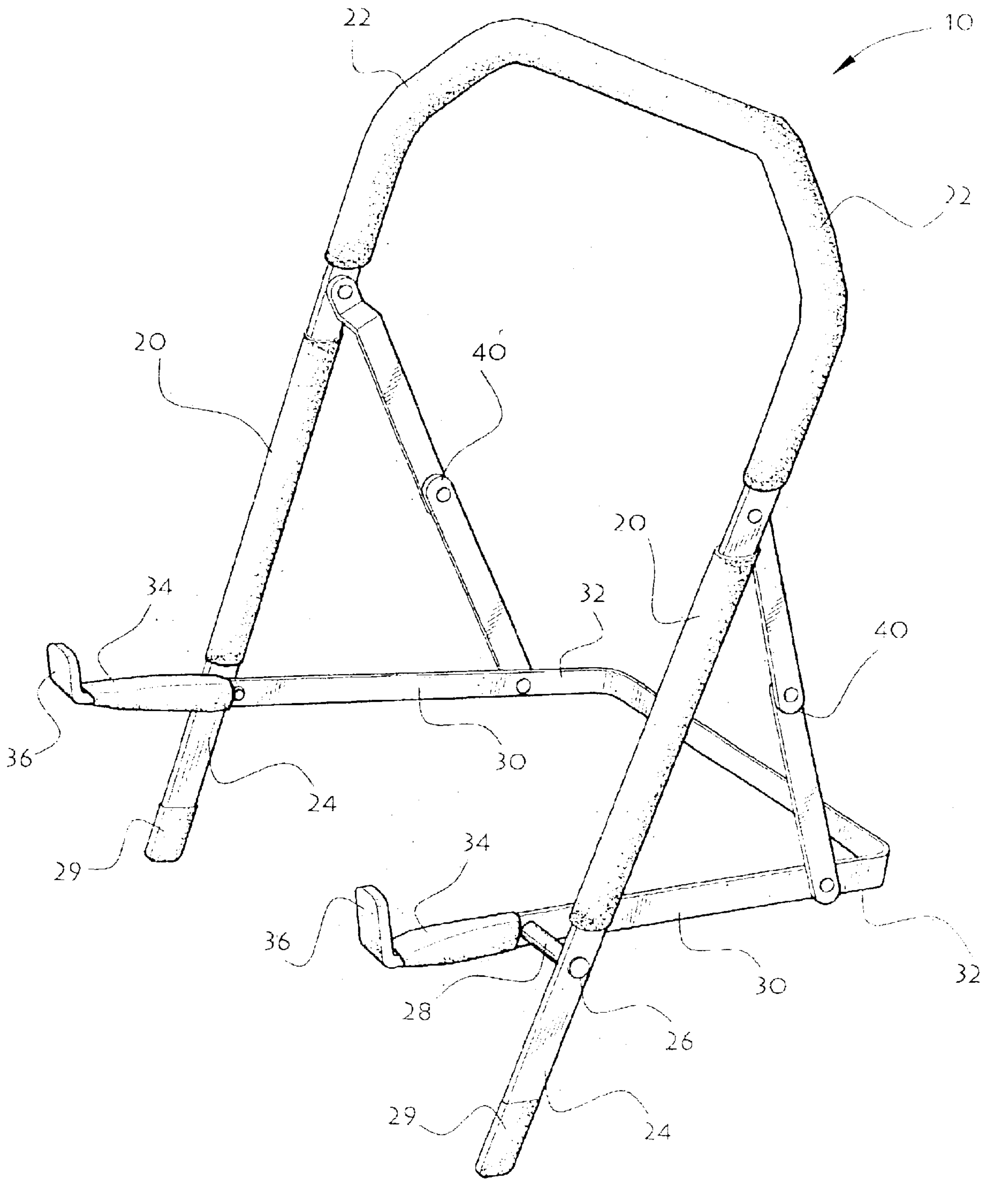
FIG. 2 is a front side perspective view of a banjo and guitar stand that is in an open position.

The folding banjo and guitar stand 10 is depicted in an open position in FIG. 2. The two folding support hinges 40 can lock in a single position, enabling the second inverted U-shaped bar 30 and the two folding support hinges 40 to support the first inverted U-shaped bar 20 in a locked upright position. Note that the lower portion of the first inverted U-shaped bar 24 and the lower portion of the second inverted U-shaped bar 34 are both resting securely on the ground, while the folding banjo and guitar stand 10 is in the open position it is only in the open position that the folding banjo and guitar stand 10 can secure a banjo or guitar B or G. Note that each end 36 of the lower portion of the second inverted U-shaped bar 34 is turned-up to insure that the bottom of a banjo or a guitar B or G being supported by the folding banjo and guitar stand 10 cannot slide off of the lower portion of the second inverted U-shaped bar 34. The lower portion of the second inverted U-shaped bar 34 extends perpendicularly from the lower portion of the first inverted U-shaped bar 24 to hold the bottom of a banjo or guitar B or G being secured by the folding banjo and guitar stand 10.

The lower portion of the second inverted U-shaped bar 34 is also provided with a cushioned thermoplastic coating that protects the banjo or guitar B or G from damage to exposed metal and keeps the banjo or guitar B or G from sliding off of the folding banjo and guitar stand 10. Similarly, most of the front surface of the first inverted U-shaped bar 20 above the lower portion of the second inverted U-shaped bar 34 is also provided with a cushioned thermoplastic coating to further protect the banjo or guitar B or G being secured by the folding banjo and guitar stand 10. The very end of the lower portion of the first inverted U-shaped bar 24 is also provided with a thermoplastic covering 29 to prevent the folding banjo and guitar stand 10 from sliding on a slippery bottom surface or scratching a bottom surface.

Figure 3:
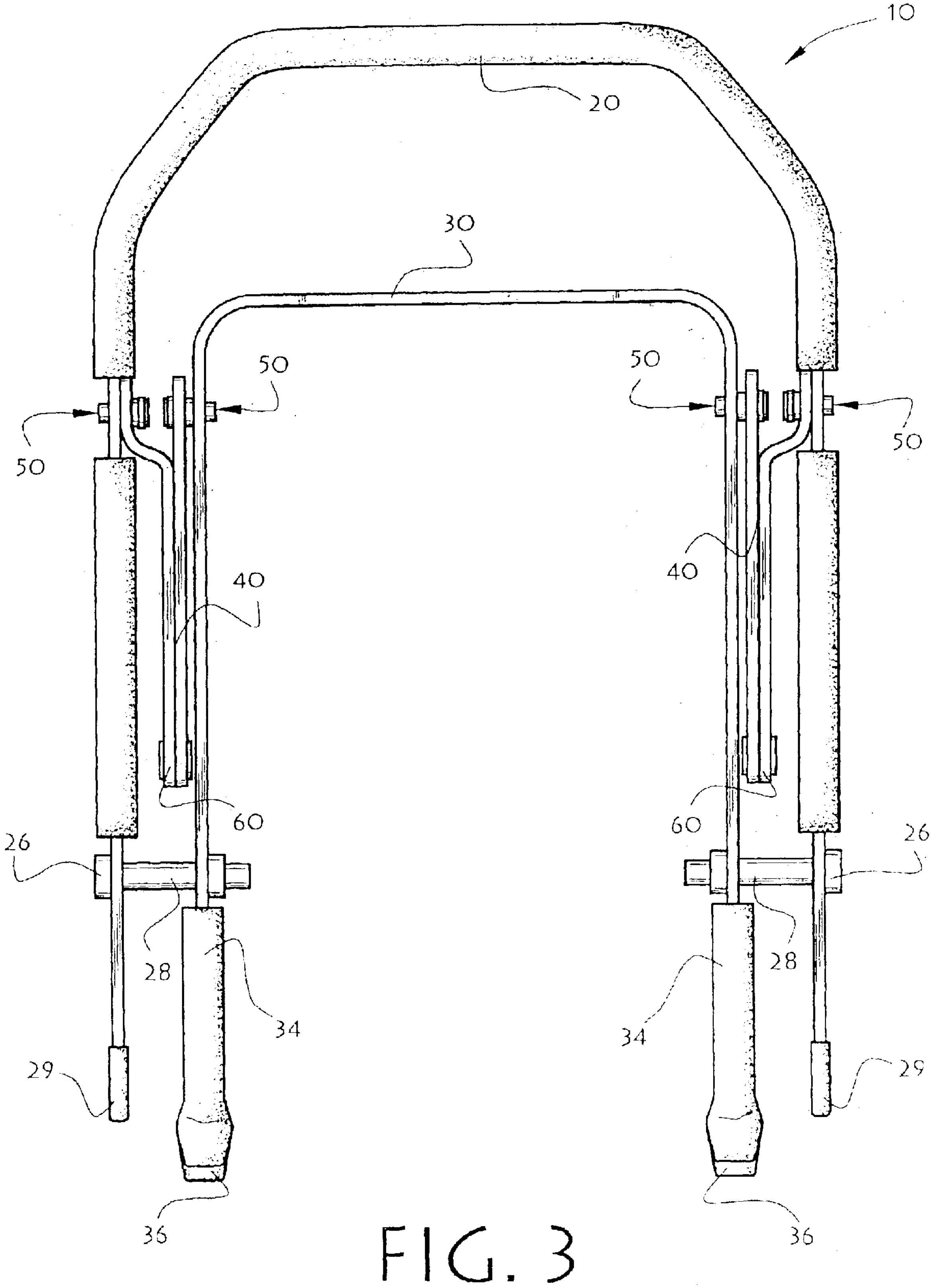
FIG. 3 is front perspective view of a banjo and guitar stand that is folded-up.

The two folding support hinges 40 can be folded-up to bring the second inverted U-shaped bar 30 into a flat planar position within the first inverted U-shaped bar 20, as is depicted in FIG. 3. This makes the folding banjo and guitar stand 10 easier and more convenient to carry in a briefcase, bag or guitar or banjo case. The spacer 28 provided between the first inverted U-shaped bar 20 and the second inverted U-shaped bar 30 provides enough room for the entire pair of folding support hinges 40 to fit between the first inverted U-shaped bar 20 and the second inverted U-shaped bar 30. The folding support hinges 40 are attached to the first inverted U-shaped bar 20 and the second inverted U-shaped bar 30 with a pop rivet and washer assembly 50, that acts like a bearing to reduce wear and tear. The folding support hinges 40 can lock the folding banjo and guitar stand 10 into place or bend at the middle joint 60 to fold the second inverted U-shaped bar 30 into a flat, planar carrying position, as is depicted in FIG. 3.

The folding banjo and guitar stand 10 folds-up to about 1" in thickness and weighs less than 2 pounds. The first inverted U-shaped bar 20 and the second inverted U-shaped bar 30 are made of shaped flat iron and the folding support hinges 40 are rust resistant metal. The cushioned thermoplastic material used to protect the banjo or guitar B or G being secured are well-known to those schooled in the related art, as is the thermoplastic material provided on the ends 29 of the lower portion of the second inverted U-shaped bar 34. The entire folding banjo and guitar stand 10 is approximately 10" wide and 16" high.

It is to be understood that the present invention is not limited to the sole embodiments described above, but encompasses any and all embodiments within the scope of the following claims.

I claim:

1. A foldable stand for musical instruments, comprising:

a first inverted U-shaped member defining an upper portion, a middle portion, and a lower portion;

said upper portion including a cross bar member;

said middle portion having a pair of legs extending parallelly from said cross bar member of said upper portion;

said lower portion having a pair of feet, each foot extending linearly from one of said legs;

a second inverted U-shaped member defining an upper portion, a middle portion, and a lower portion;

said upper portion having a cross bar member;

said middle portion having a pair of legs extending parallelly from said cross bar member of said upper portion;

said lower portion having a pair of feet, each foot extending linearly from each one of said legs, and each said foot has a perpendicularly extending end piece;

a pair of pivotal connectors, said pivotal connectors connecting said first and said second inverted U-shaped member;

each one of said pivotal connectors forming a pivot between each said middle portion and said lower portion of said first and said second U-shaped members; and a pair of lockable hinges, each one of said hinges includes a first end, a second end and a central pivot;

said first end of each hinge is connected to said first U-shaped member at a point between said upper portion and said middle portion; and said second end of each hinge is connected to said second U-shaped member at a point between said upper portion and said middle portion;

wherein said central pivot allows said first and second hinges to fold a folded position, and said first and said second U-shaped members to fold flat, such that said first U-shaped member circumscribes said second U-shaped member;

whereby when said hinges are in a locked position, said feet of said first U-shaped member, and said upper portion of said second U-shaped member are adapted to rest on a support surface, said upper portion of said first U-shaped member, and said feet and perpendicularly extending end pieces of said second U-shaped member form a cradle to support a musical instrument.

2. The foldable stand according to claim 1, wherein said lower portion of said second inverted U-shaped member is provided with a cushioning coating.

3. The stand according to claim 1, wherein said feet of said lower portion of said first inverted U-shaped member are provided with a protective coating.

4. The stand according to claim 1, wherein each of said upper portion and said middle portions of said first inverted U-shaped member is provided a cushioning coating.

5. A foldable stand for musical instruments, comprising:

a first inverted U-shaped member having a first leg and a second leg, said first leg and said second leg including a linearly extending end portion;

a second inverted U-shaped member having a first leg and a second leg, said first leg and said second leg including a perpendicularly extending end portion;

a first connector and a second connector;

said first connector pivotally connecting said first leg of said first U-shaped member and said first leg of said second U-shaped member at a point adjacent said end portions;

said second connector pivotally connecting said second leg of said first U-shaped member and said second leg of said second U-shaped member at a point adjacent said end portions; and a first hinge and a second hinge, each said first hinge and said second hinge movable between a folded position and an unfolded position;

said first hinge connected to said first leg of said first U-shaped member at a point opposite said end portion;

said first hinge connected to said first leg of said second U-shaped member at a point opposite said end portion;

wherein said first connector is between said first hinge connections and said end portions;

said second hinge connected to said second leg of said first U-shaped member at a point opposite said end portion;

said second hinge connected to said second leg of said second U-shaped member at a point opposite said end portion;

wherein said second connector is between said second hinge connections and said end portions;

whereby when said first and second hinges are in the folded position, and said first and said second U-shaped members are flatly disposed, such that said first U-shaped member circumscribes said second U-shaped member; and whereby when said first and second hinges are in the unfolded position, said linearly extending end portions of said first U-shaped member are adapted to rest on a support surface, said perpendicularly extending end portions of said second U-shaped member form a cradle adapted to support a musical instrument.

6. The foldable stand according to claim 5, wherein said first and second U-shaped members have a cushioning coating.

* * * * *